United States Patent
Nagata

[11] Patent Number: 5,205,679
[45] Date of Patent: Apr. 27, 1993

[54] ROTARY TOOL FOR GENERATING BEVEL GEARS

[75] Inventor: Shigeyoshi Nagata, Tokyo, Japan

[73] Assignee: Kyoiku Haguroma Kogyo Kabushiki-kaisha, Tokyo, Japan

[21] Appl. No.: 825,123

[22] Filed: Jan. 24, 1992

[30] Foreign Application Priority Data

Jan. 30, 1991 [JP] Japan ............................ 3-9915

[51] Int. Cl.⁵ .............................................. B23F 21/18
[52] U.S. Cl. ...................................... 407/23; 409/11; 409/13
[58] Field of Search ............................ 407/20, 23–27; 51/52 HB, 287; 409/11, 12, 13

[56] References Cited

U.S. PATENT DOCUMENTS 2,102,659 12/1937 Wildhaber .......................... 409/12
4,322,185 3/1982 Tanimoto et al. ..................... 407/23

FOREIGN PATENT DOCUMENTS 4008833 8/1990 Fed. Rep. of Germany ........ 407/23

Primary Examiner—Steven C. Bishop
Attorney, Agent, or Firm—Burns, Doane, Swecker & Mathis

[57] ABSTRACT

A rotary tool for generating bevel gears, characterized in that a module m at a plane of rotation which is away from a reference point on a central axis by a distance $\xi$ in the axial direction is shown by an equation;

$$m = m_0(1 + \kappa\xi)$$

where, $m_0$ denotes a module at the reference point and $\kappa$ is a constant.

9 Claims, 3 Drawing Sheets

ROTARY TOOL FOR GENERATING BEVEL GEARS

INDUSTRIAL FIELD OF UTILIZATION

The present invention relates to a rotary tool such as a hob cutter, screw-type grinding stone, or the like which is used to generate bevel gears.

PRIOR ART

Module of a bevel gear is not constant but linearly changes in dependence on an axial displacement.

On the other hand, since the module of a conventional hob cutter is constant, it is considered that any bevel gear cannot be generated by the tool such as a hob cutter.

Therefore, the bevel gears are manufactured by cutting teeth by a special gear cutting machine while indexing an amount of cutting for every tooth. Such a kind of gear cutting machine is expensive and a working efficiency is low and it is unsuitable for mass production. There is also a problem in terms of the accuracy.

It is extremely convenient if the bevel gears can be manufactured by the hobbing machine.

Problems that the Invention is to solve

The present invention was made to solve the above problems and it is an object of the invention to provide a novel rotary tool such as a hob cutter or a screw-type grinding stone for a gear grinding machine which is similar with a conventional hobbing machine or the like which can generate bevel gears by using a gear hobbing machine which is simple and inexpensive in construction.

Means of Solving the Problems

The above object of the invention is accomplished by a rotary tool for generating bevel gears characterized in that a module m at a plane of rotation which is away by a distance $\xi$ from a reference point on the central axis is expressed by the equation (1).

$$m = m_0(1 + \kappa\xi) \quad (1)$$

where, $m_0$ denotes a module at cross section through the reference point and $\kappa$ is a constant.

A pitch surface of the tooth of the tool is not only a cylinder but also a cone.

The tool may be provided as a hob cutter, a screw-type grinding stone for a gear grinding machine like a hobbing machine, or an electrode for electrical discharge machining.

Teeth blades of the tool may be ground by a CNC (computer numerical control) type screw thread grinding machine.

Operation

Modules of the rotary tool according to the present invention linearly change in the axial displacement so as to be adapted to the modules of the bevel gear to be cut.

With the rotary tool according to the present invention, therefore, the bevel gears can be mass-produced at a high accuracy using the same method as the cutting method of the tapered gears by an inexpensive hobbing machine.

Further, according to the present invention, since works such as chamfering of the tooth edges and the like can be also executed simultaneously with the tooth cutting, it is effective to reduce the number of gear producing steps and to reduce the costs.

EMBODIMENTS

An embodiment of the present invention will be described hereinbelow in detail by the accompanying drawings.

Figure 1:
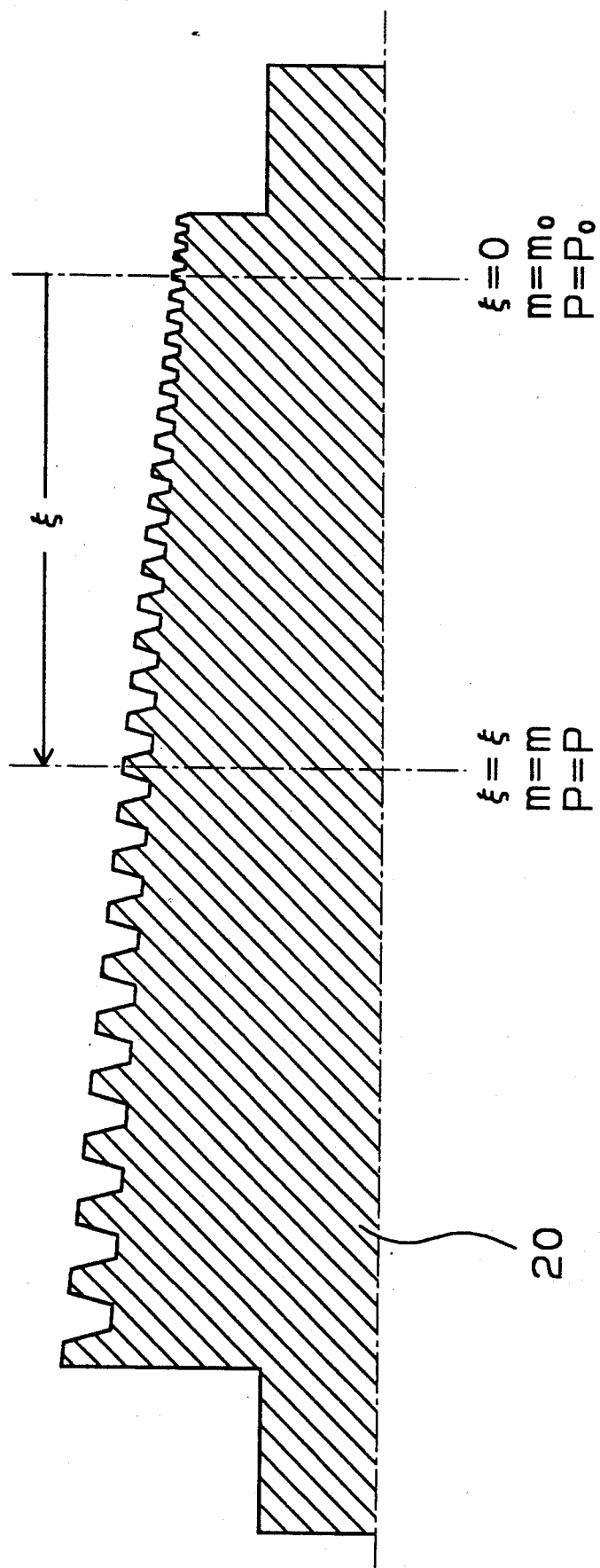
FIG. 1 is a longitudinal sectional view showing an example of a sectional tooth profile in the axial direction of a rotary tool according to the present invention.

In the embodiment shown in FIG. 1, a pitch surface of the rotary tool has a shape of a truncated cone. Pitch and module of the rotary tool are not constant but continuously change along a helicoidal curve.

Explaining further specifically, assuming that a module at the plane of rotation through the reference point is set to $m_0$, a module m at a plane of rotation which is away from the reference point by only the distance $\xi$ in the axial direction is expressed by the above equation (1).

In this embodiment, although the pitch surface has a conical shape, it can be also constructed with a cylindrical shape.

Figure 3:
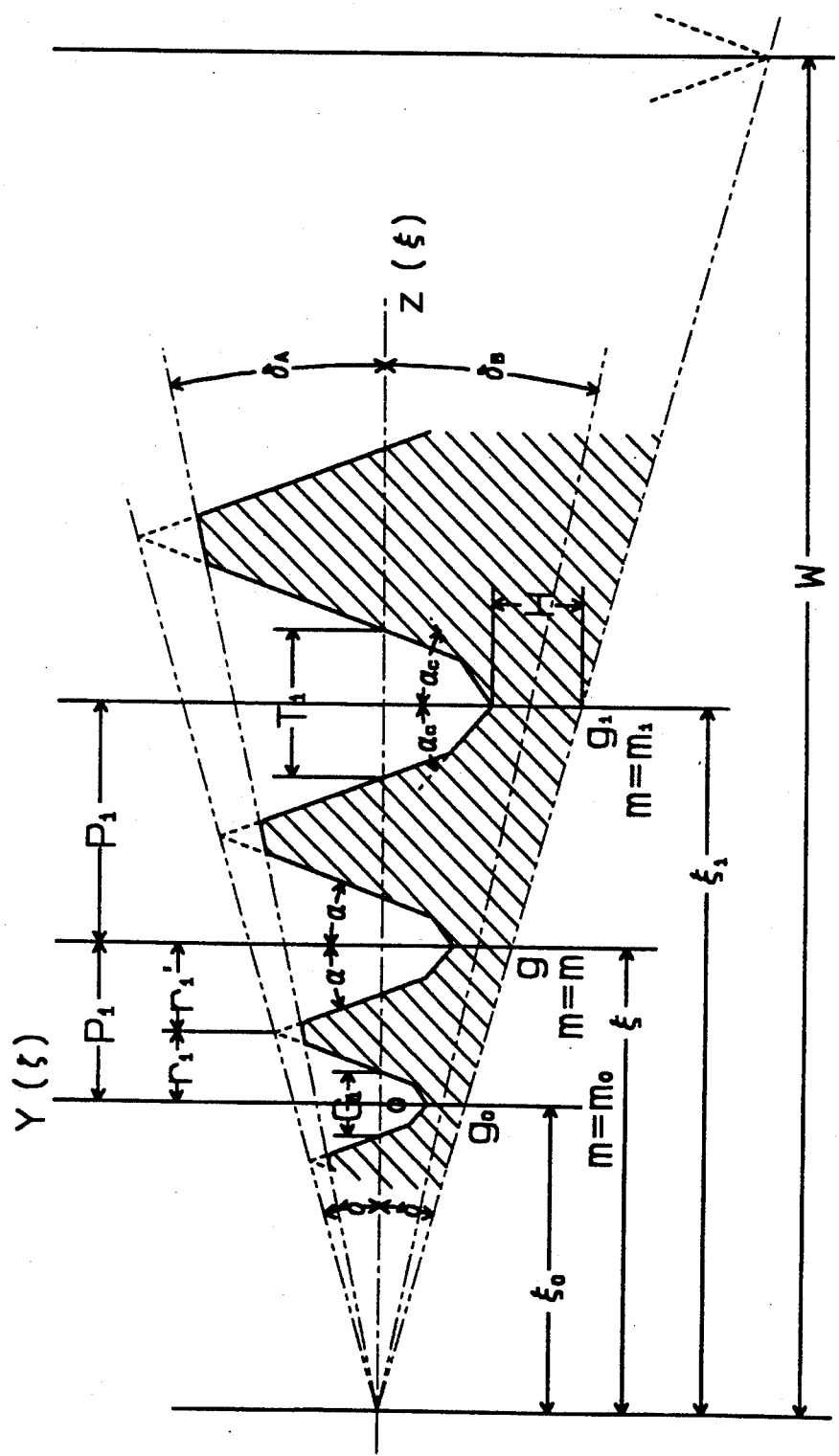
FIG. 3 is a schematic view showing an example of a bevel gear cutting method by the rotary tool according to the present invention.

FIG. 3 shows a tooth profile which is corrected so as to chamfer the gear by the same step as the tooth cutting step and to form a curved portion to the tooth bottom portion. Since such a tooth profile correction of the hobs is well known, it is merely shown as a diagram and its detailed description is omitted.

Figure 2:
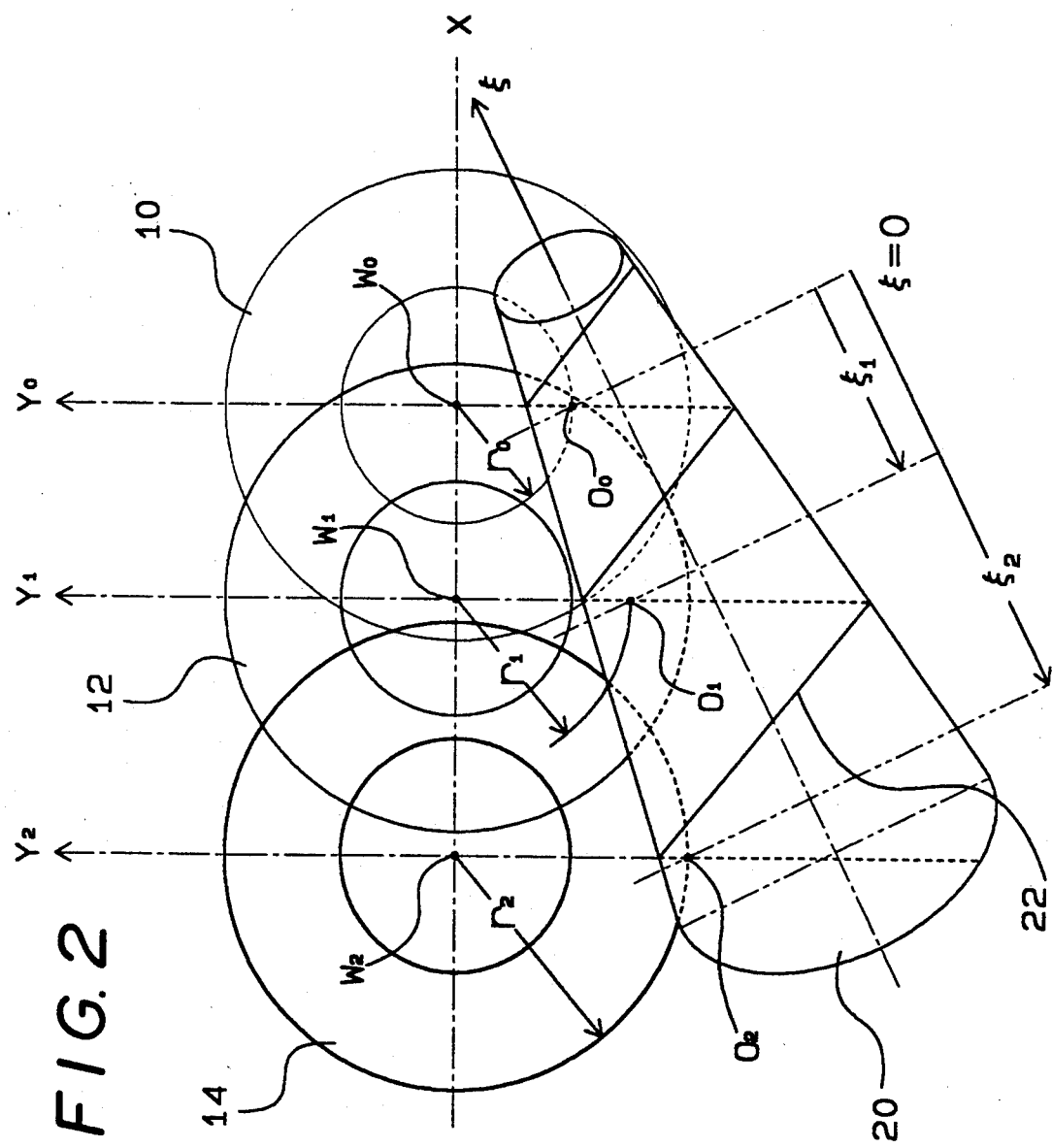
FIG. 2 is a partial enlarged cross sectional view showing the details of the tooth profile according to another embodiment.

In FIG. 2, reference numeral 10 denotes a workpiece to be worked into a bevel gear; 12 a workpiece under working; 14 a generated bevel gear; and 20 a rotary tool according to the present invention.

When the workpiece 10 is worked by using the rotary tool 20, a hobbing machine almost similar to the well-known hobbing machine for generating various kinds of gears is used.

The bevel gear hobbing is different from the ordinary hobbing in that since the module of the bevel gear linearly change in dependence on the axial displacement, it is necessary to use a rotary tool whose module linearly changes so as to always match the module of the gear and tool which perform the mutual interlocking motion during generating of the gear.

Since the diameter of a bevel gear linearly changes in dependence on the axial displacement, it is necessary to take into consideration a change in diameter in order to satisfy the engaging conditions between the gear and the tool.

FIG. 2 shows an example in the case of generating a bevel gear from the front cone side (small diameter side) to the back cone side (large diameter side).

It is now assumed that the center of the workpiece 10 is first located at $W_0$, the contact point between the pitch cone of the workpiece 10 and the pitch circular cone of the rotary tool 20, namely, the interlocking point is located at a point $O_0$ which is away from the center $W_0$ of the workpiece by a radius $r_0$, and the modules of both of the bevel gear and the rotary tool at that point are equal to the reference value $m_0$.

In this state, the interlocking motion between the workpiece 10 and the hob cutter 20 similar to that of the well-known hob is made continuous, thereby the teeth of the front cone portion of the workpiece 10 are generated.

When a series of workings of that portion are completed, the workpiece 10 is gradually shifted to the left in the drawings. The position of the rotary tool 20 is corrected if necessary. The interlocking motion is continued while matching the modules of both of them.

When the workpiece exists at the position shown by reference numeral 12, the portion corresponding to the central plane of rotation is worked.

In this case, the center of the workpiece is set to $W_1$, the interlocking point is set to $O_1$, and the portion which is away from the center $W_1$ of the workpiece by a distance $r_1$ is cut. In this portion, the modules of both of them are equal to $m_1$ which are given by the equation (2);

$$m_1 = m_0(1 + \kappa \xi_1) \quad (2)$$

Similarly, the back cone side of the gears, that is, the portion which is away from the center $W_2$ of the gear 14 by a distance $r_2$ is worked.

The interlocking point at this time is set to $O_2$ and the modules of both of them are equal to $m_2$ which are given by the equation (3);

$$m_2 = m_0(1 + \kappa \xi_2) \quad (3)$$

A ratio of the maximum module to the minimum module of the rotary tool according to the present invention can be set to about 20 to 40. Not only a single-thread hob but also a multi-thread hob can be provided. For instance, almost all of the common techniques regarding the well-known hobbing machine and hobs such as correction of tooth profile for crowning, chamfering or the like can be applied to the present invention. The rotary tool according to the present invention can be used by slightly modifying the well-known hobbing machine.

Effect of the Invention

Since the present invention is constructed as mentioned above, according to the present invention, the highly accurate bevel gears can be inexpensively mass-produced.

What is claimed is:

1. A rotary tool for generating bevel gears, characterized in that a module m at a plane of rotation which is away from a reference point on a central axis by a distance $\xi$ in the axial direction is shown by an equation;

$$m = m_0(1 + \kappa \xi)$$

where, $m_0$ denotes a module at the reference point and $\kappa$ is a constant.

2. A rotary tool for generating bevel gears according to claim 1, wherein its pitch surface is cylindrical.

3. A rotary tool for generating bevel gears according to claim 1, wherein its pitch surface is conical.

4. A rotary tool for generating bevel gears according to claim 3, wherein said rotary tool is a hob cutter.

5. A rotary tool for generating bevel gears according to claim 3, wherein said rotary tool is a screw-shaped grinding stone.

6. A rotary tool for generating bevel gears according to claim 1, wherein said rotary tool is a hob cutter.

7. A rotary tool for generating bevel gears according to claim 2, wherein said rotary tool is a hob cutter.

8. A rotary tool for generating bevel gears according to claim 1, wherein said rotary tool is a screw-shaped grinding stone.

9. A rotary tool for generating bevel gears according to claim 2, wherein said rotary tool is a screw-shaped grinding stone.

* * * * *